United States Patent [19]
Lee et al.

[11] Patent Number: 6,037,544
[45] Date of Patent: Mar. 14, 2000

[54] SPLICE CLOSURE FOR TELECOMMUNICATIONS CABLES

[75] Inventors: Jeoung-Yeoun Lee, Taejeon; Jeong-su Yu, Tejeon; Jang-youl Rhee; Dong-pyo Kim, both of Taejeon; Hui-jung Kim, Kyungki-do; Jae-ik Whang, Kyungki-do; Sang-Cheol Lee, Kyungki-do, all of Rep. of Korea

[73] Assignees: LG Chemical Ltd; LG Cable and Machinery Ltd., both of Seoul, Rep. of Korea

[21] Appl. No.: 09/197,257

[22] Filed: Nov. 20, 1998

[30] Foreign Application Priority Data

Nov. 22, 1997 [KR] Rep. of Korea ............ 97-62237
Jun. 19, 1998 [KR] Rep. of Korea ............ 98-23122

[51] Int. Cl.[7] .............................................. H02G 15/113
[52] U.S. Cl. .................................. 174/92; 174/93
[58] Field of Search .................... 174/92, 77 R, 174/76, 93

[56] References Cited

U.S. PATENT DOCUMENTS

| | | | |
|---|---|---|---|
| 4,216,351 | 8/1980 | Brandeau | 174/92 |
| 4,558,174 | 12/1985 | Massey | 174/92 |
| 4,620,815 | 11/1986 | Goetter | 174/92 X |
| 4,875,952 | 10/1989 | Mullin et al. | 174/92 X |
| 4,879,436 | 11/1989 | Braham | 174/92 |
| 4,933,512 | 6/1990 | Nimiya et al. | 174/92 |
| 5,155,303 | 10/1992 | Bensel, III et al. | 174/77 R X |
| 5,525,756 | 6/1996 | Mullaney et al. | 174/92 |
| 5,824,961 | 10/1998 | Burek et al. | 174/92 X |
| 5,844,171 | 12/1998 | Fitzgerald | 174/92 |
| 5,886,300 | 3/1999 | Strickler | 174/92 X |

*Primary Examiner*—Kristine Kincaid
*Assistant Examiner*—Chau N. Nguyen
*Attorney, Agent, or Firm*—Baker Botts L.L.P.

[57] ABSTRACT

Disclosed is a splice closure for telecommunications cables. The splice closure includes a body having an upper portion and a lower portion, at least one entrance hole formed at opposing ends of the body, a plurality of flanges formed longitudinally along edges of both the upper and lower portions of the body where the same are joined, a compound reservoir formed between the flanges and into which a sealing compound is injected to form a seal, end stoppers having at least one cable hole and which are provided at ends of the splice closure, and plugs received in the cable holes of the end stoppers.

4 Claims, 8 Drawing Sheets

SPLICE CLOSURE FOR TELECOMMUNICATIONS CABLES

BACKGROUND OF THE INVENTION (a) Field of the Invention

The present invention relates to a splice closure for telecommunications cables, and more particularly, to a splice closure for telecommunications cables which fully encloses a splice between two telecommunications cables to seal both a point of juncture of the cables and points of entrance into the splice closure.

(b) Description of the Related Art

Wires used for telecommunications are sheathed to form cables. The cables are manufactured at predetermined lengths so that a plurality of the cables must be spliced to obtain a length suitable for application. Splice closures are used at the points where the cables are spliced to provide a secure connection to the cables, and to protect the spliced portions from the many stresses telecommunications cables are subjected to before, during and after installment such as exposure to sunlight and water, tension, vibrations, ingestion of the outer covering by insects, etc.

Although many different configurations are used for the conventional splice closure, most utilize either (a) a gasket or sealing tape; or (b) the splice is covered with an internal closure and an external closure, and a sealing compound is injected between the two closures to seal the splice. Also, points of entrance into the splice closure are typically sealed using highly-adhesive sealing tape, or by using polyurethane grommet to form a plug between the two closures in (b) above.

However, the conventional splice closures have one or more of the following drawbacks, depending on which of the above structures are used: the sealed portions lose their integrity over time; a large number of parts are required, thereby complicating the process of splicing cables; the compound injected between the two closures overly increases the weight of the cables; and/or the costs for producing the splicing closures is high.

There also exist drawbacks with regard to the conventional methods of sealing the points of entrance into the splice closure by the cables. That is, in the case where sealing tape is used to seal the area where the cables enter the splice closures, the viscidity of the adhesive side of the tape makes the sealing process difficult. Further, the quality of the seal varies greatly depending on the level of experience of the person performing the sealing operation. Another drawback is that the sealing tape breaks down over time as a result of environmental stress Finally, when points of entrance into the splice closure are sealed by forming a plug portion using polyurethane, used with the above method of applying an internal closure and an external closure around the splice and injecting a sealing compound therebetween, although this method is effective in preventing the sealing compound from leaking from the two closures, it is not effective in forming a seal between the cable and the closures.

SUMMARY OF THE INVENTION

The present invention has been made in an effort to solve the above problems.

It is an object of the present invention to provide an economically-manufactured splice closure for telecommunications cables which fully seals and protects a point of juncture of spliced telecommunications cables.

It is another object of the present invention to provide an economically-manufactured splice closure for telecommunications cables which improves the seal at the points of entrance into the splice closure, and enables this sealing process to be conducted easily.

To achieve the above objects, the present invention provides a splice closure for telecommunications cables. The splice closure includes a body having an upper portion and a lower portion, at least one entrance hole formed at opposing ends of the body, a plurality of flanges formed longitudinally along edges of both the upper and lower portions of the body where the same are joined, and a compound reservoir formed between the flanges and into which a sealing compound is injected to form a seal.

According to a feature of the present invention, a plurality of bolt screw holes is provided at corresponding positions on the upper and lower portions of the body, and a plurality of bolts are screwed into the bolt screw holes to join the upper and lower portions of the body. The bolt screw holes are provided at predetermined intervals.

According to another feature of the present invention, a compound injection hole is formed on one end of the upper portion of the body, and an air escape hole is formed on the other end of the upper portion of the body, the compound injection hole and the air escape hole communicating with the compound reservoir.

According to yet another feature of the present invention, end stoppers having at least one cable hole are provided at ends of the splice closure, and plugs are received in the cable holes of the end stoppers. It is preferable that the end stoppers and the plugs are made of an elastic material.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

A preferred embodiment of the present invention will now be described in detail with reference to the accompanying drawings.

Figure 1:
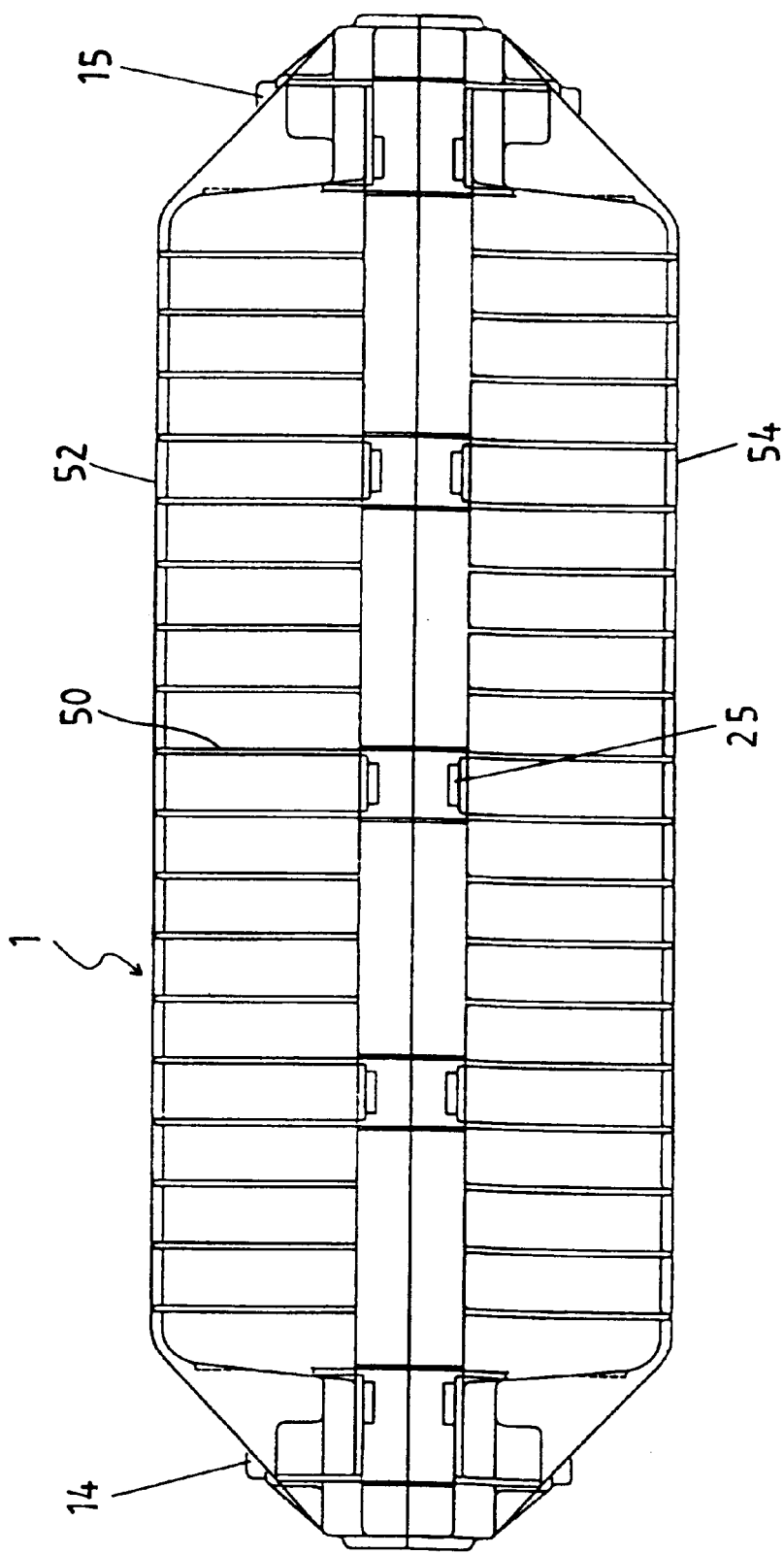
FIG. 1 is a side view of a splice closure for telecommunications cables according to a preferred embodiment of the present invention.

Referring first to FIG. 1, shown is a side view of a splice closure for telecommunications cables according to a preferred embodiment of the present invention. As shown in the drawing, an exterior of the splice closure for telecommunications cables according to a preferred embodiment of the present invention is defined by a body 1. The body 1 is preferably made of a hard insulating material such as plastic well-known in the art. A plurality of reinforcing fins 50 are formed on an exterior of the body 1 to strengthen the same. With this structure, the body 1 of the splice closure protects elements therein including portions of telecommunications cables to be spliced. The body 1 is divided into an upper portion 52 and a lower portion 54, formed substantially identical to one another, and the upper and lower portions 52 and 54 are joined by bolts 25. As a result of the dome-shape of the upper and lower portions 52 and 54, a cavity is formed in the body 1 when the upper and lower portions 52 are coupled by the bolts.

Figure 2:
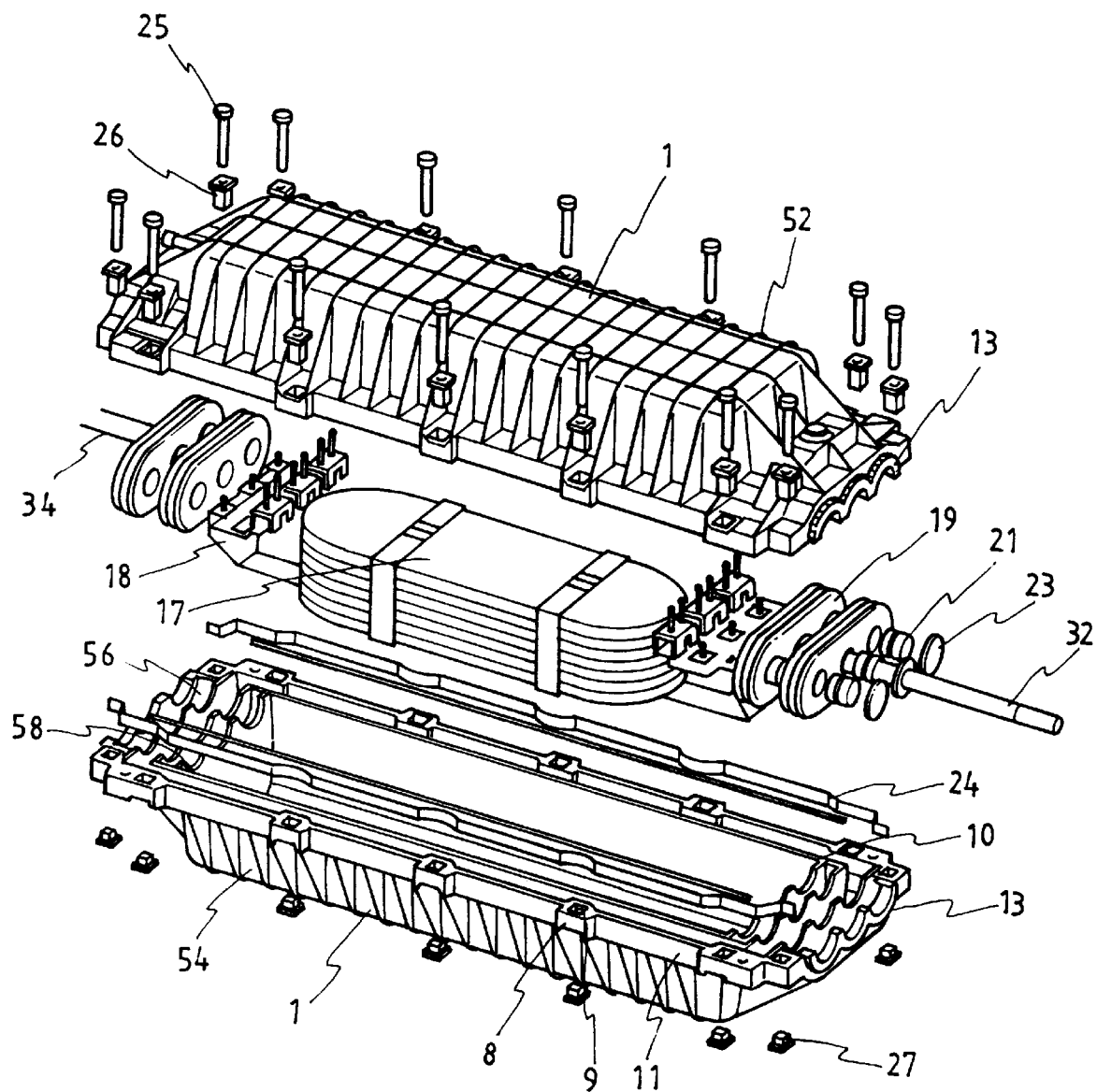
FIG. 2 is an exploded perspective view of the splice closure shown in FIG. 1.

FIG. 2 is an exploded perspective view of the splice closure shown in FIG. 1. As shown in the drawing, each of the upper and lower portions 52 and 54 of the body 1 has inner flanges 10 and outer flanges 11, formed longitudinally on both sides of each the upper and lower portions 52 and 54. Gaskets 24 are mounted between the inner and outer flanges 10 and 11. The positioning of the gaskets 24 will be described in more detail hereinafter.

A plurality of bolt supports 8 are integrally formed along the outer flanges 11 of the upper and lower portions 52 and 54 of the body 1, and bolt holes 9 are formed passing through the bolt supports 8. Stays 26 are inserted in the bolt holes 9 of the upper portion 52 of the body 1, and connectors 27 are inserted in the bolt holes 9 of the lower portion 54 of the body 1. With the formation of threads (not shown) on a lower end of the bolts 25, and on an inner circumference of the connectors 27, the bolts 25 are passed through the stays 26 and screwed into the connectors 27 to couple the upper portion 52 of the body 1 to the lower portions 54 of the same.

Figure 3:
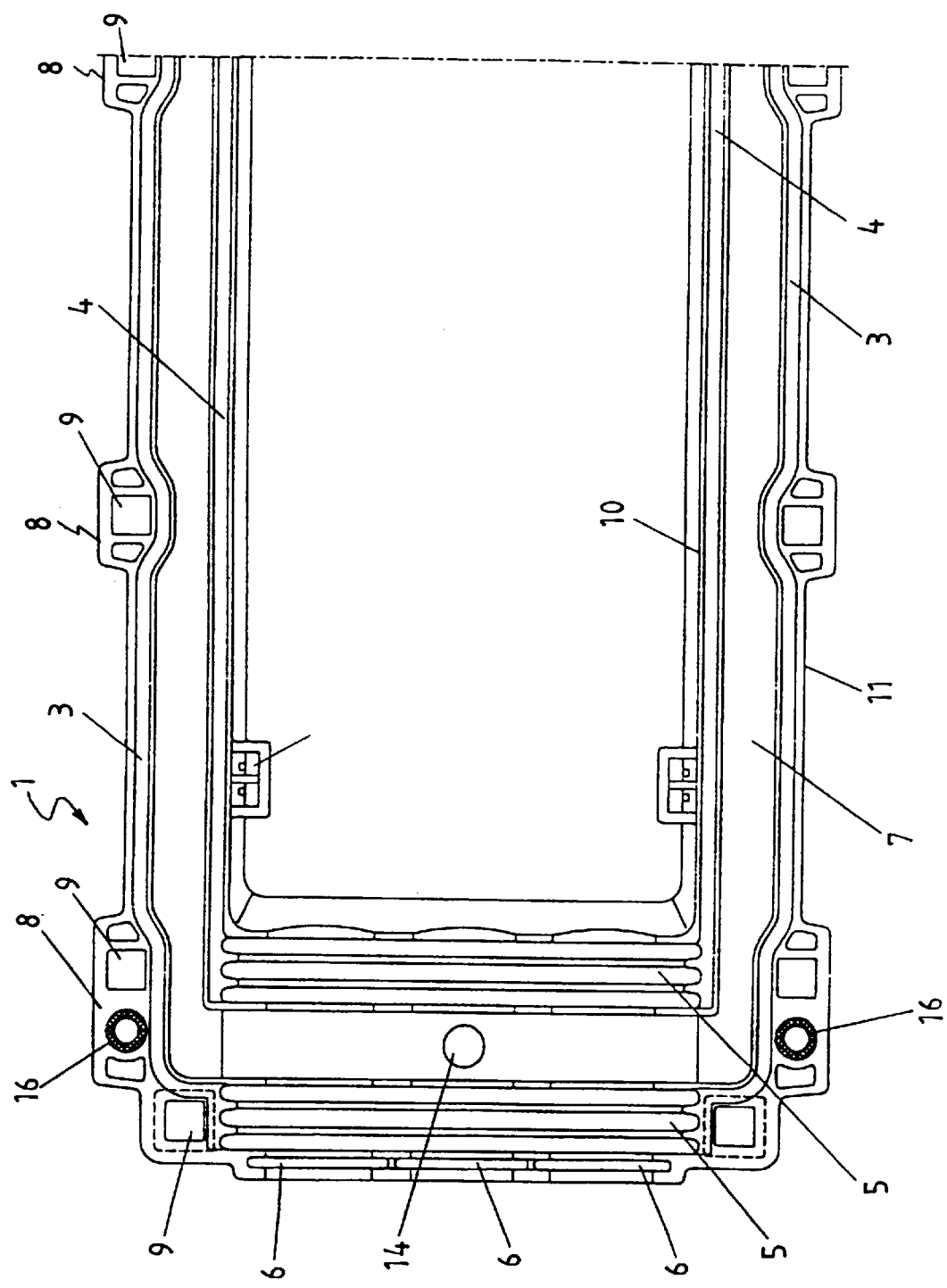
FIG. 3 is a top view of a lower portion of a body of the splice closure shown in FIG. 1.
Figure 4:
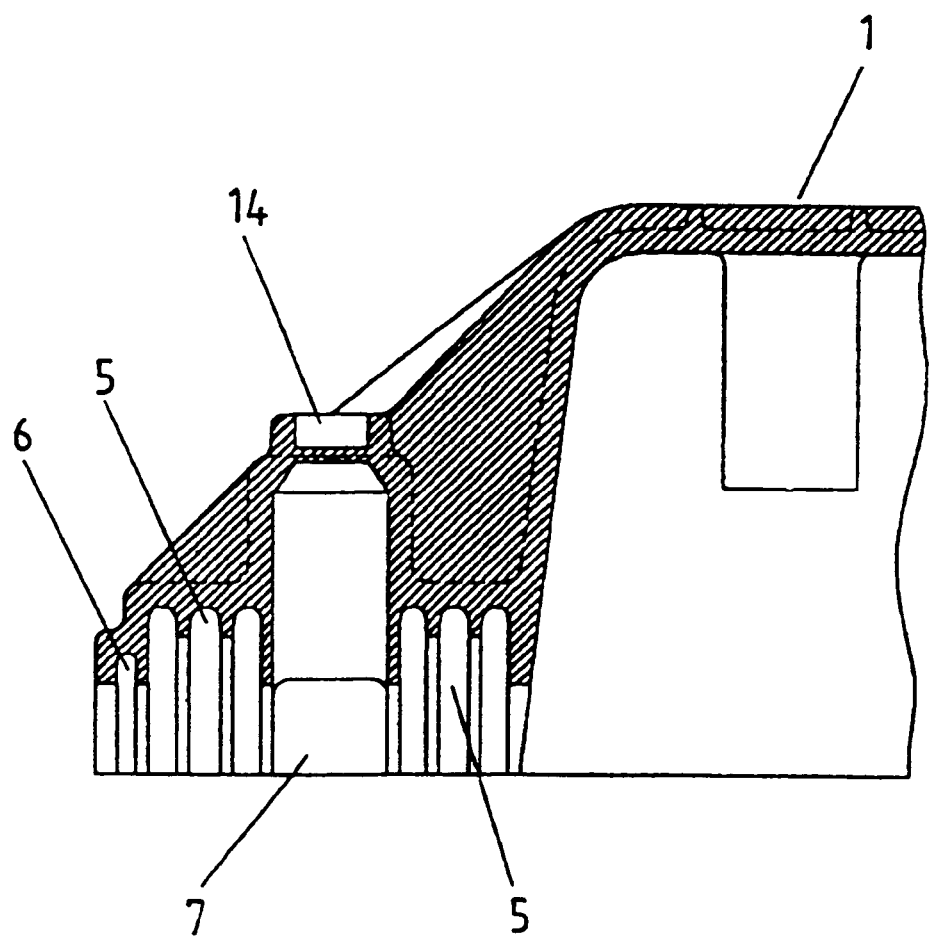
FIG. 4 is a partial sectional view of the splice closure shown in FIG. 1.
Figure 5:
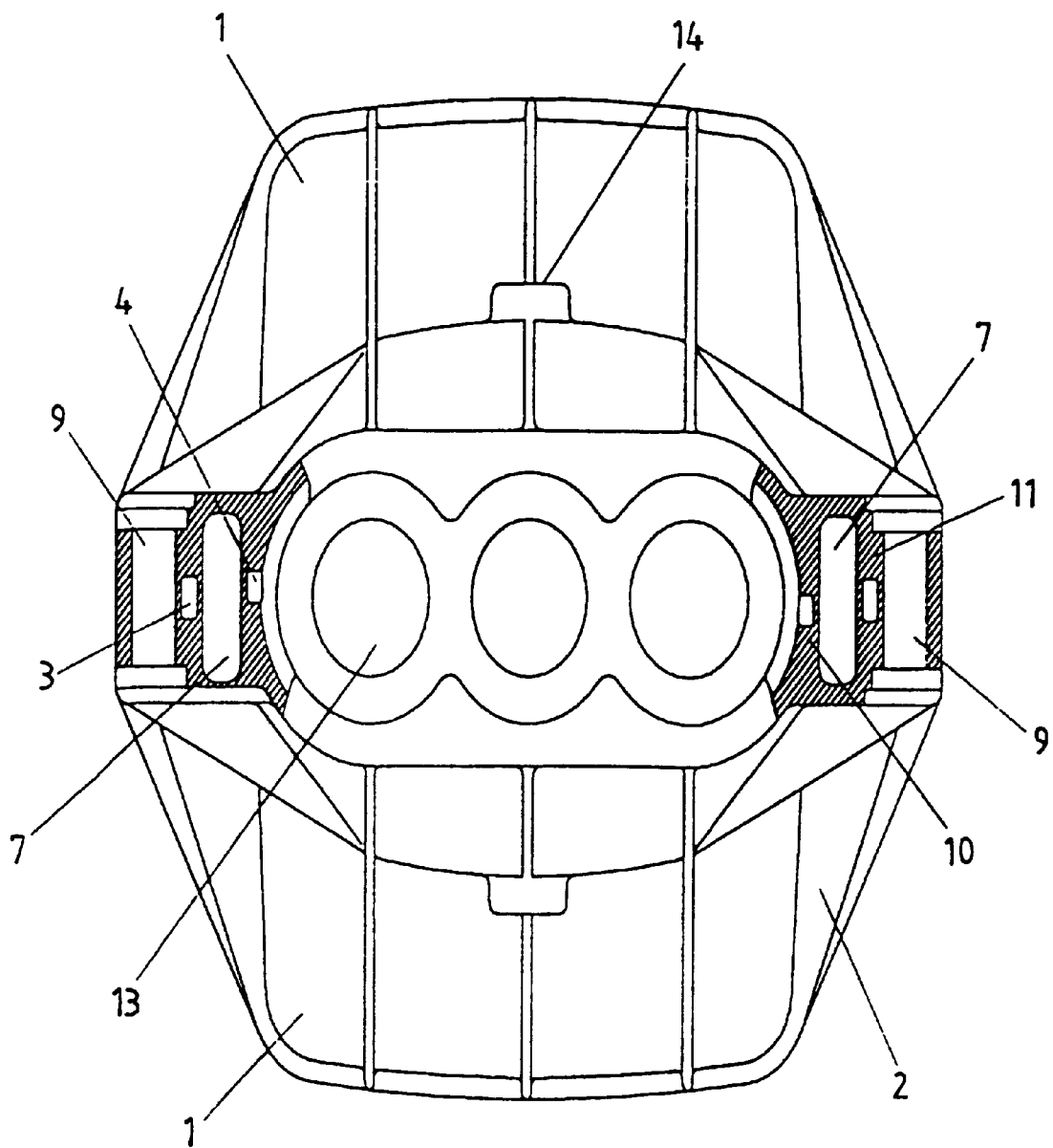
FIG. 5 is a perspective view of an end of the splice closure shown in FIG. 1.

FIG. 3 is a top view of the lower portion 54 of the body 1, FIG. 4 is a partial sectional view of the splice closure, and FIG. 5 is a perspective view of an end of the inventive splice closure. As shown in the drawings, an outer gasket groove 3 is formed between the outer flanges 11, and an inner gasket groove 4 is formed between the inner flanges 10. The gaskets 24 are inserted in the outer gasket grooves 3, and another pair of gaskets (not shown) are inserted in the inner gasket grooves 4.

Formed between the outer and inner gasket grooves 3 and 4, and along ends of the body 1 is a compound reservoir 7, into which a sealing compound is injected. When the upper portion 52 is coupled to the lower portion 54, a sealed tunnel is formed by the compound reservoir 7 around an inner circumference of the splice closure. A size of the compound reservoir 7 is such that a sufficient amount of a sealing compound can be held therein to provide an effective seal, but not an excessive amount to overly increase the weight of the splice closure. Further, formed on one end of the body 1 is a compound injection hole 14 through which a sealing compound is injected into the compound reservoir 7, and formed on the other end of the body 1 is an air escape hole 15 (see FIG. 1) through which air is exhausted during the injection of the sealing compound into the compound reservoir 7 via the compound injection hole 14.

As shown in FIG. 3, threaded holes 16 are provided on four corners (only those one end are shown in the drawing) of the outer flanges 11. The threaded holes 16 are used to secure the splice closure to perform work on the same when disassembled.

Referring to FIG. 5, a plurality of entrance holes 13 are formed through each end of the body 1. Telecommunications cables are inserted into the splice closure through the entrance holes 13. As shown in FIG. 2, two rows of the entrance holes 13 are provided on each end of the body 1. The entrance holes 13 are realized by the formation of half circles in each of the upper and lower portions 52 and 54 of the body 1.

As shown in FIG. 2, provided inwardly from the entrance holes 13 on both ends of the splice closure are cable piercing assemblies 18. Also, a connecting member 17 is mounted between the cable piercing assemblies 18, the connecting member 17 being electrically connected to the cable piercing assemblies 18. Both the connecting member 17 and the cable piercing assemblies 18 are electrically conductive. With this structure, when a first cable 32 is inserted in one of the entrance holes 13 on one side of the splice closure and connected to the corresponding cable piercing assembly 18, and a second cable 34 is inserted in one of the entrance holes on another side of the splice closure and connected to the corresponding cable piercing assembly 18, the two cables 32 and 34 are connected, or spliced.

Figure 6:
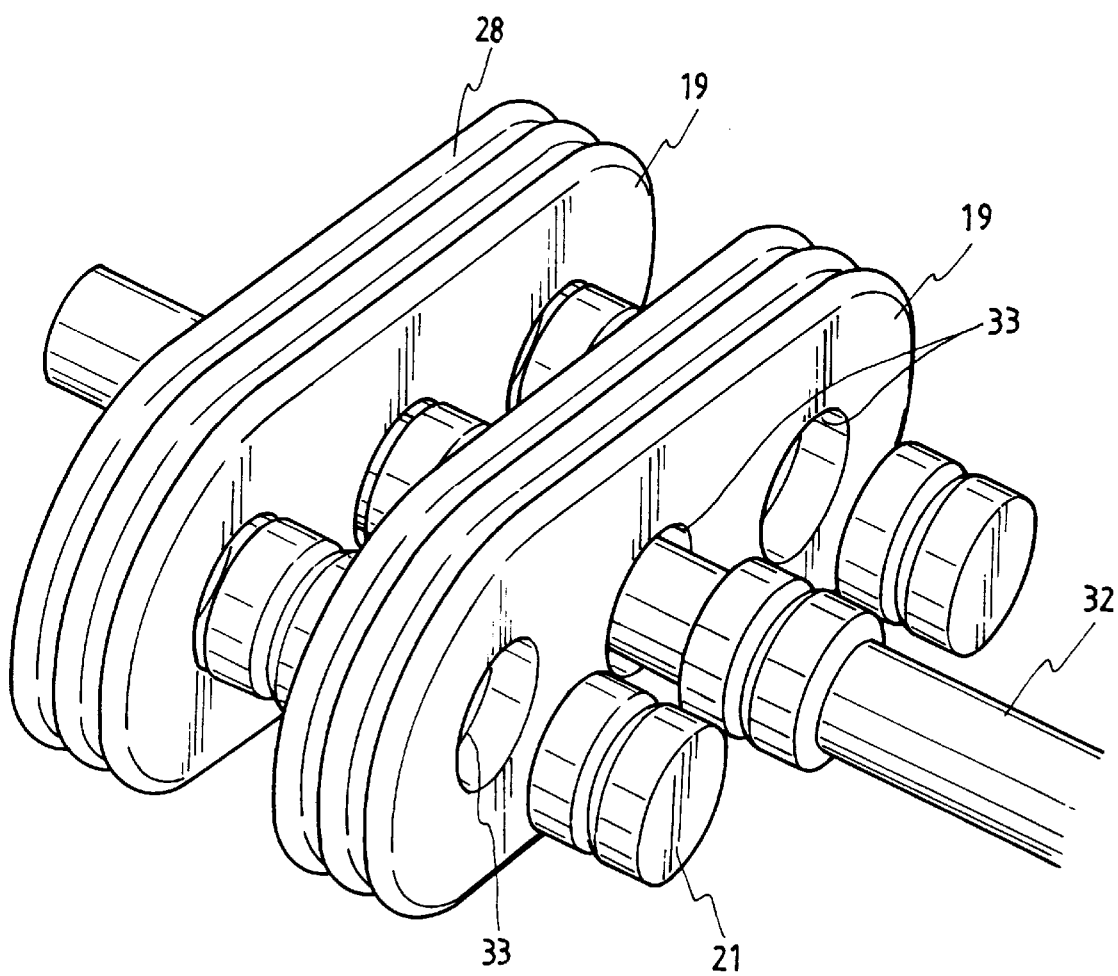
FIG. 6 is a perspective view of an end stopper and a plug of the splice closure shown in FIG. 1.

Referring again to FIG. 2, a pair of end stoppers 19 are provided on each end of the body 1 adjacent to each row of the entrance holes 13. An outer gap 56 and an inner gap 58 are formed at the ends of the body 1 to receive the end stoppers 19. As shown in FIGS. 5 and 6, ribs 28 are formed around an outer circumference of the end stoppers 19 which fit into rib grooves 5 formed in each of the gaps 56 and 58 (see FIG. 3). Accordingly, an airtight seal is formed between the end stoppers 19 and the outer and inner gaps 56 and 58. Also, at least one cable hole 33 is formed in each end stopper 19. The cable 32 is inserted through one of the entrance holes 13 of the body 1 then through a corresponding cable hole 33 of the end stoppers 19.

Figure 7:
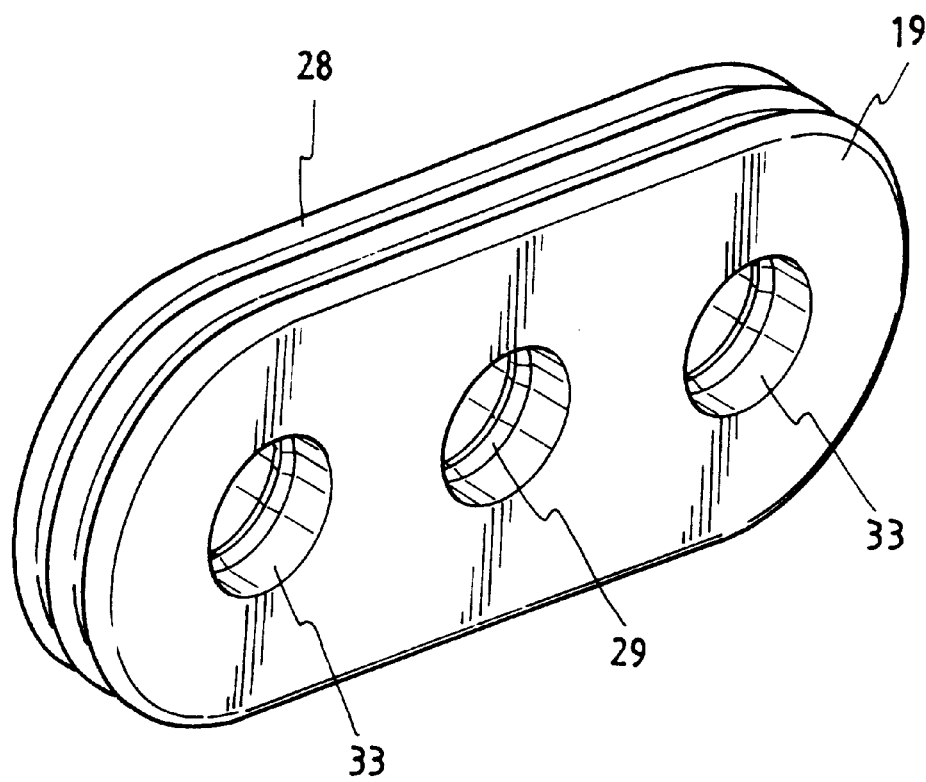
FIG. 7 is a perspective of the end stopper of the splice closure shown in FIG. 1.
Figure 8:
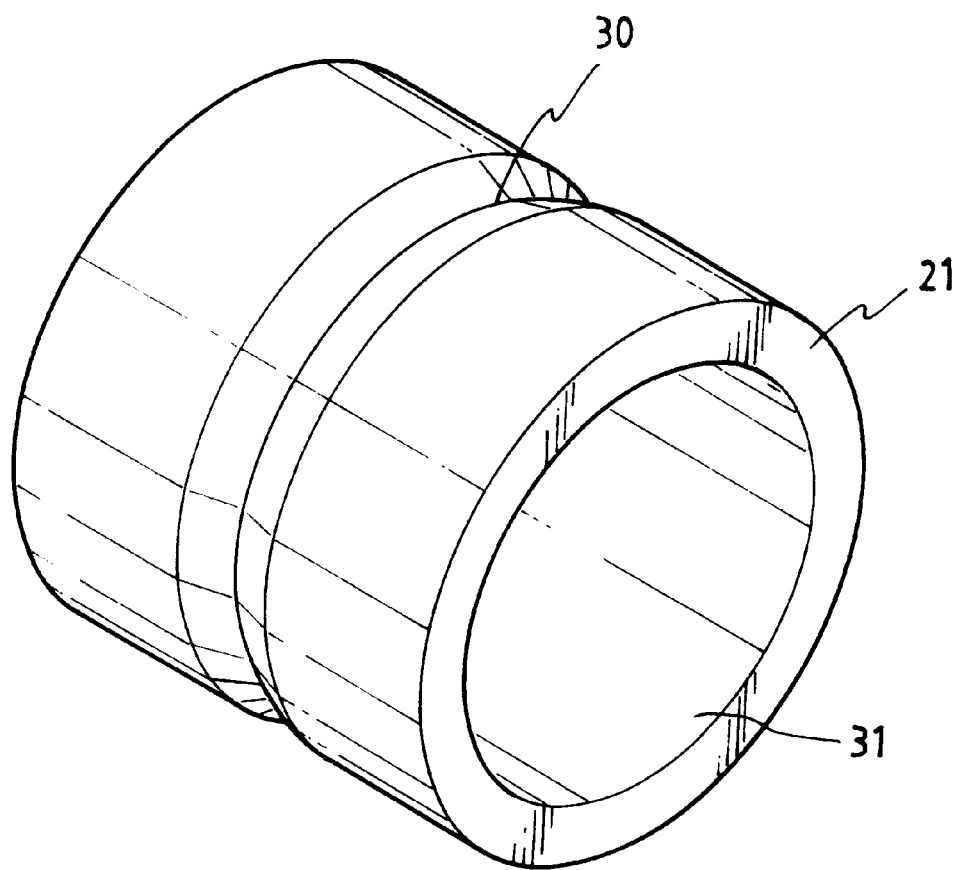
FIG. 8 is a perspective view of the plug of the splice closure shown in FIG. 1.

Further, catch protrusions 29 (see FIG. 7) are formed in each of the cable holes 33 of the end stoppers 19. The catch protrusions 29 secure plugs 21 that are inserted in the cable holes 33, and also act to form a seal between the plugs 21 and the end stoppers 19. That is, a catch groove 30 is formed around an outside circumference of each of the plugs 21 (see FIG. 8), and when the plugs 21 are inserted in the cable holes 33, the catch protrusions 29 of the same are inserted in the catch grooves 30 of the plugs 21, thereby firmly securing the plugs 21 in the cable holes 33 and forming an airtight seal between the same. As can be seen in FIG. 8, the plugs 21 have formed hollows 31 through a center of the same.

In the above, the end stoppers 19 and the plugs 21 are made of an elastic material, preferably synthetic resin.

The cable 32 is passed through the entrance holes 13 of the body 1 and tightly fitted through hollows 31 of the plugs 21, thereby passing through the cable holes 33 of the end stoppers 19. The hollows 31 of the plugs 21 are sized to correspond to a diameter of the cable 32 to be used. That is, the hollows 31 of the plugs 21 have a diameter that is slightly smaller than the diameter of the cable 32 such that the same fits tightly in the hollows 31.

In addition, caps 23, made of the same material as the body 1, are inserted in cap grooves 6 formed inwardly from the entrance holes 13 of the body 1. The cap grooves 6 are formed between the entrance holes 13 and the rib grooves 5. With the placement of the caps 23 in the cap grooves 6, the entrance holes 13 are completely sealed when the upper and lower portions 52 and 54 of the body 1 are coupled.

In the splice closure for telecommunications cables structured as in the above, since the two flanges are formed in the area where the upper and lower portions of the body are joined, and gaskets are provided in the inner and outer gasket grooves, corresponding respectively to the inner and outer flanges, a tight seal can be formed between the upper and lower portions of the body. Further, by filling the sealing compound in the compound reservoir provided between the inner and outer flanges after the splice closure is fully assembled, a tight seal can be formed between the upper and lower portions of the body. Here, excessive weight is not added to the splice closure, as with the conventional splice closure using a sealing compound, since the compound is only injected into the area where it is needed. With this structure, the splice closure can be economically manufactured, and the point where the two cables are joined can be fully protected from environmental stresses.

Further, with the application of the rubber end stoppers and plugs at the entrance of the splice closure, an airtight seal is obtained at the ends of the splice closure and between the wire and the entrance holes. The splicing of telecommunications cables is easy with such a configuration.

Other embodiments of the invention will be apparent to the skilled in the art from consideration of the specification and practice of the invention disclosed herein. It is intended that the specification and examples be considered as exemplary only, with the true scope and spirit of the invention being indicated by the following claims.

What is claimed is:

1. A splice closure for telecommunications cables comprising:

a body having an upper portion and a lower portion;

at least one entrance hole formed at each of opposing ends of the body;

a plurality of flanges including outer flanges and inner flanges formed longitudinally along each side edge of both the upper and lower portions of the body where the portions are joined;

a compound reservoir formed between the flanges and into which a sealing compound is injected to form a seal;

an outer gasket groove formed between the outer flanges in which a gasket can be inserted;

an inner gasket groove formed between the inner flanges in which another gasket can be inserted;

at least one end stopper having at least one cable hole and which is provided at the at least one entrance hole; and at least one plug received in the at least one cable hole of the at least one end stopper.

2. The splice closure of claim 1 and further comprising a compound injection hole formed on one end of the upper portion of the body, and an air escape hole formed on the other end of the upper portion of the body, the compound injection hole and the air escape hole communicating with the compound reservoir.

3. The splice closure according to claim 1 wherein the least one end stopper includes an outer end stopper, and an inner end stopper provided in a longitudinal direction of the splice closure, thereby forming a triple sealing structure.

4. The splice closure according to claim 3 wherein at least one at least one protrusion rib is formed at the outer end stopper corresponding to an at least one outer stopper groove, wherein the protrusion rib and the at least one outer stopper groove are provided at constant intervals.

* * * * *